United States Patent [19]

Shriver

[11] Patent Number: 5,205,375
[45] Date of Patent: Apr. 27, 1993

[54] TREE STAND STABILIZER

[76] Inventor: Jarold A. Shriver, 801 NE. Holliman La., Lee's Summit, Mo. 64063

[21] Appl. No.: 694,506

[22] Filed: May 2, 1991

[51] Int. Cl.$^5$ ............................................. A45F 3/26
[52] U.S. Cl. .................................... 182/187; 108/152
[58] Field of Search .................. 182/187, 188, 150; 248/218.4, 231, 524, 499; 108/152; 52/146, 148

[56] References Cited

U.S. PATENT DOCUMENTS

| | | | |
|---|---|---|---|
| 500,527 | 6/1893 | Brickley | 182/188 |
| 1,515,831 | 11/1924 | Bush | 182/188 |
| 1,685,716 | 9/1928 | Mullen | 52/148 |
| 2,527,036 | 10/1950 | Schroeder | 182/187 X |
| 2,919,946 | 1/1960 | Miener | 248/499 X |
| 3,148,857 | 9/1964 | Hutchinson | 182/187 X |
| 3,352,379 | 11/1967 | Riggs | 182/187 X |
| 3,353,773 | 11/1967 | Budd | 248/524 X |
| 3,405,896 | 10/1968 | Eby | 248/524 X |
| 3,749,200 | 7/1973 | Meyer . | |
| 3,777,428 | 12/1973 | Caufield | 52/146 |
| 3,855,649 | 12/1974 | Morris et al. . | |
| 4,113,057 | 9/1978 | Bessinger . | |
| 4,388,982 | 6/1983 | Yonahara | 182/150 X |
| 4,411,335 | 10/1983 | Forrester | 182/187 X |
| 4,484,660 | 11/1984 | Baynum . | |
| 4,493,395 | 1/1985 | Rittenhouse | 182/187 |
| 4,667,773 | 5/1987 | Davis . | |
| 4,722,421 | 2/1988 | Hilbert . | |
| 4,730,699 | 3/1988 | Threlkeid . | |
| 4,730,700 | 3/1988 | Miller et al. . | |
| 4,802,552 | 2/1989 | Williams | 182/187 |
| 4,889,309 | 12/1989 | McCure | 248/524 |
| 4,987,972 | 1/1991 | Helms . | |
| 5,009,285 | 4/1991 | Ramsey | 182/187 |

OTHER PUBLICATIONS

Article entitled "Treestand Manufacturers Initiate Industry Safety Council To Reduce Hunting Accidents", North American Hunter, Sep. 10, 1990, p. 22, no author.
Article "Think on These Things", Field & Stream, Oct. 1990, pp. 28, 30, L. Atwill.
Article "Tree Stand Sense", author Kyle L. Carroll, Missouri Conservation, Oct. 1990, pp. 20-23.
Article "Deer Hunter's Guide to Tree Stands", Sports Afield, Aug. 1989, pp. 41-43, 86, L. Atwill.

Primary Examiner—Alvin C. Chin-Shue
Attorney, Agent, or Firm—Hovey, Williams, Timmons & Collins

[57] ABSTRACT

A tree stand stabilizer is provided which exerts a downward force on the platform of a tree stand positioned on a tree in elevated relationship to the ground, thereby serving to force the platform into the tree and limit downward movement of the platform. The stabilizer includes an anchor portion connected to the tree, an attachment portion connected to the platform distally to the portion of the platform lying in engagement with the tree, and a connecting member which preferably includes a stay under tension extending between the anchor portion and the attachment portion. The attachment portion is preferably removable from the tree and the anchor portion preferably surrounds but does not penetrate the tree to avoid injury thereto. A tensioning device is preferably connected to the stay to increase the tension thereon and thus pull downwardly on the distal end of the platform and thereby force the platform against the tree.

10 Claims, 2 Drawing Sheets

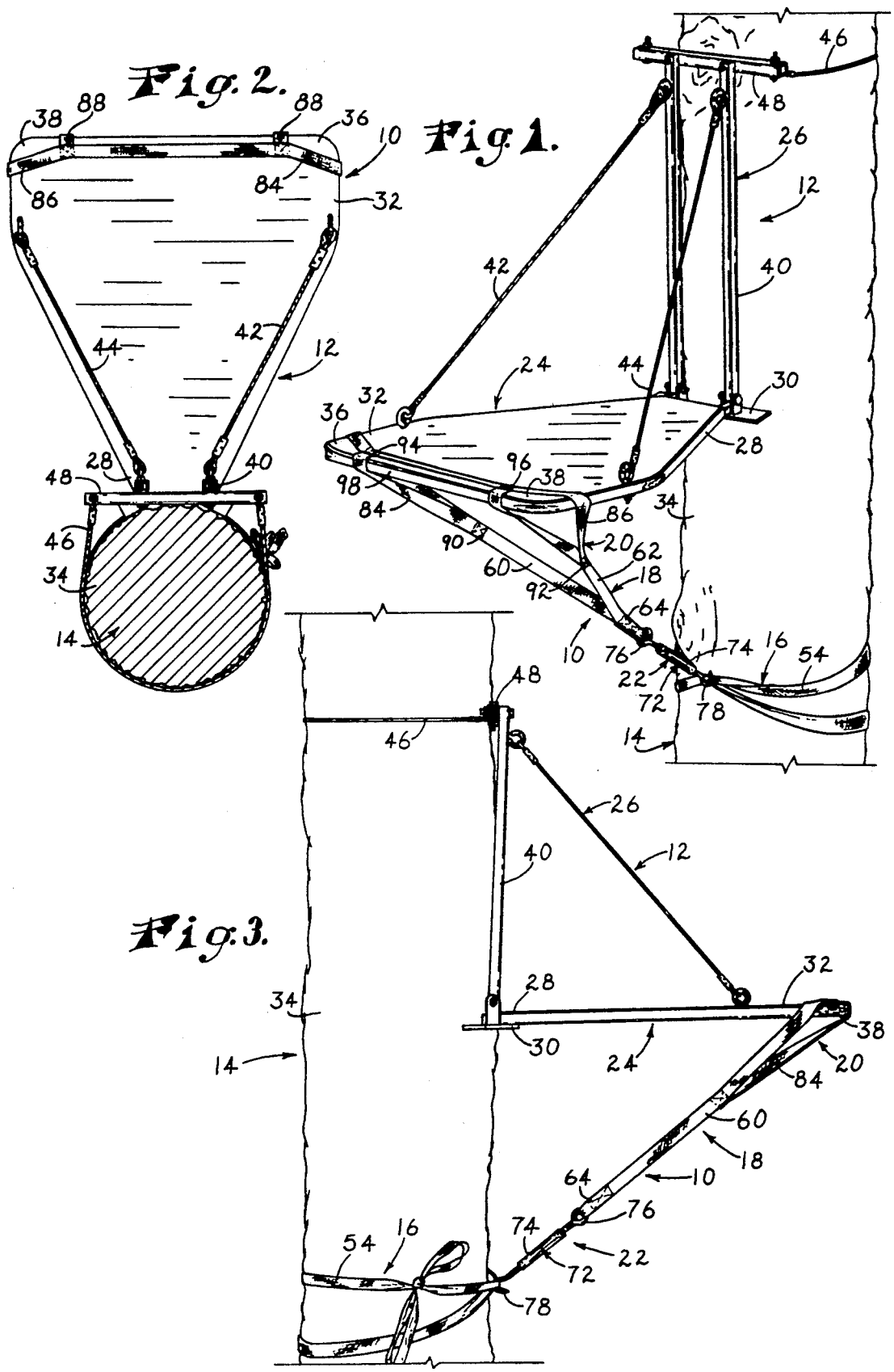

U.S. Patent    Apr. 27, 1993    Sheet 2 of 2    5,205,375
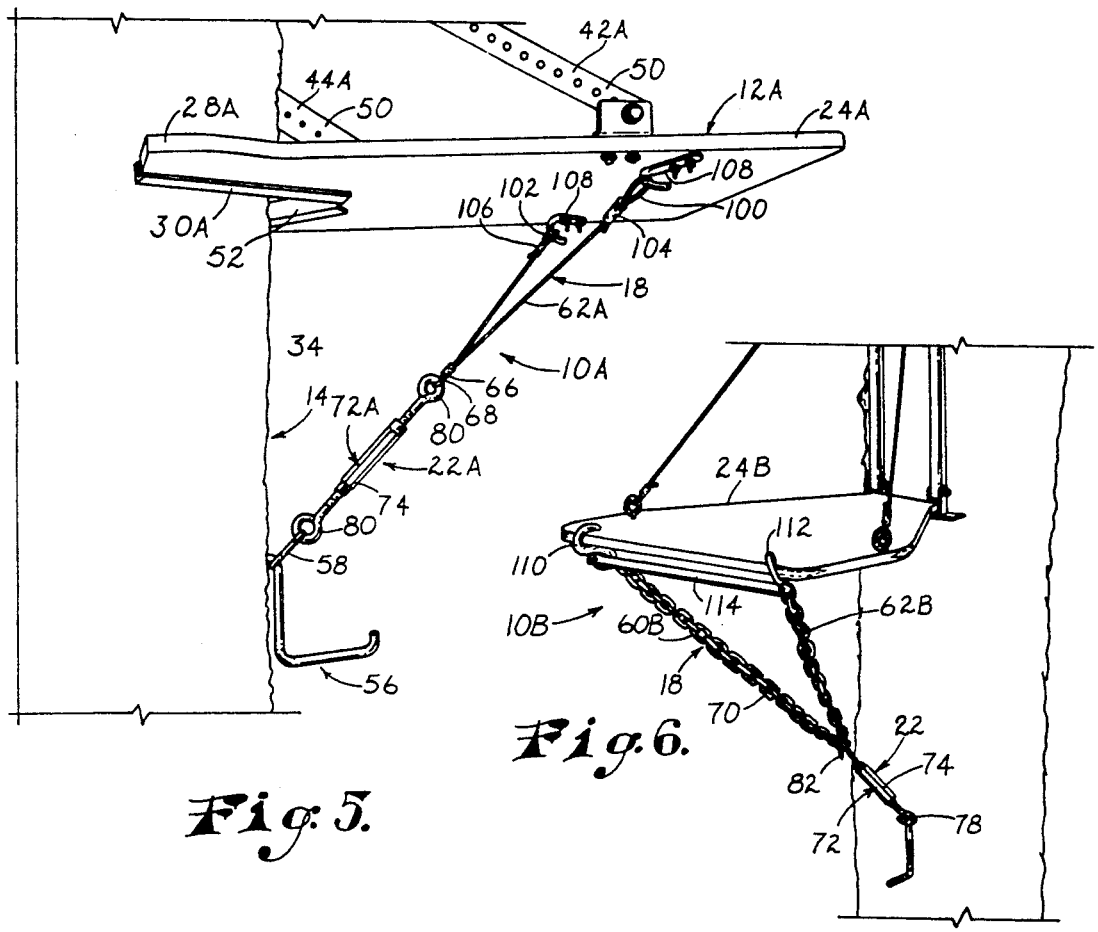
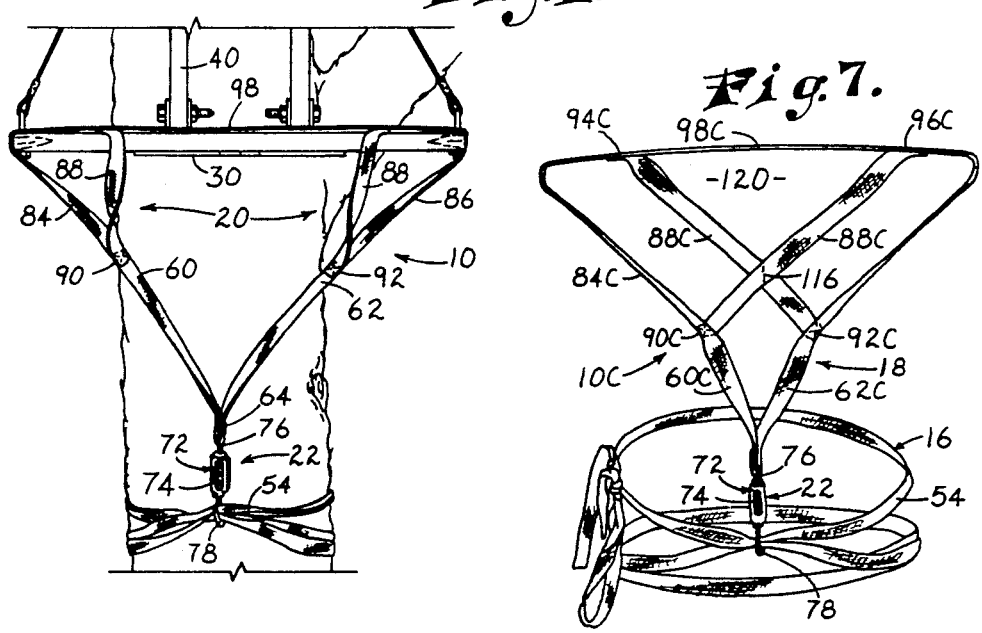

TREE STAND STABILIZER

BACKGROUND OF THE INVENTION

1. Field of the Invention

This invention relates to a device for stabilizing a tree stand having a platform which is supported from above, by exerting a downward force on the platform of the stand. The stabilizer thus pulls downwardly on the distal end of the platform to hold the tree stand in firm engagement with the tree.

2. Description of the Prior Art

Tree stands are well known to hunters and bird watchers as a mechanism for providing both an increased field of vision for the observer and lessening the likelihood that the occupant will be observed by wildlife. Tree stands, as the name implies, are supported on the tree at an elevated height above the ground, typically ten feet or more. Some tree stands are constructed by nailing boards into the tree and others involve platforms supported by braces extending between the platform and the tree. Commercially manufactured stands are usually safer than homemade stands as the latter are left in the tree and weathering causes the wood to rot and the nails to pull free over time.

One group of tree stands enjoying emerging popularity are portable stands which may be quickly and easily attached to and removed from the tree without damage thereto. For example, a law in Pennsylvania prohibits stands that might damage trees. These stands are commonly known as fixed-position stands which account for a large portion of the tree stand market. Fixed-position and some other types of stands usually have a platform which includes structure for engaging the tree (such as a bar, toothed member or V-shaped yoke) and a supporting member thereabove from which the stand hangs or is otherwise supported. The supporting structure for these stands is typically a strap, brace or other device which attaches to or around the tree and extends downwardly to support the platform. The user stands on the platform and his or her weight is supported by the supporting structure.

Unfortunately, these stands may slip, shift or loosen and cause the user to fall during use as the user shifts his or her weight. This problem is most acute when the user moves to the portion of the platform most proximate the tree. The user's weight may overcome the forces which hold the tree-engaging portion and the supporting structure to the tree. Because over twenty-eight percent of all hunting accidents in the United States are related to tree stand use, a need has developed to reduce the risk that such fixed-position stands may collapse or shift, causing the hunter to fall.

SUMMARY OF THE INVENTION

The present invention is directed toward a tree stand stabilizer which greatly enhances the safety of the user by exerting a downward force on the outboard or distal portion of the tree stand to thereby "lock" the stand into position. By exerting a downward tensioning force on the distal portion of the tree stand platform, a moment arm is created which forces the tree-engaging member associated with the platform toward and into the tree. Thus, even when the hunter or user moves toward the tree toward the inboard or proximate portion of the stand, a downward force remains in effect on the distal portion and the stand remains fixed to the tree. Yet further, the preferred tree stand of the present invention limits side to side shifting of the tree stand platform by exerting forces having opposing horizontal components thereon. By limiting side-to-side movement of the platform, a hunter or bird watcher is less likely to fall due to an unstable standing surface.

The tree stand stabilizer hereof accomplishes these functions by a structure which is surprisingly simple, compact and easy to use. Moreover, the preferred embodiment of the stabilizer hereof is adaptable for use with a wide variety of commercially available tree stands and requires no retrofitting or modification thereof for use. Alternatively, a stabilizer in accordance with the present invention could be permanently attached to a tree stand as it is originally manufactured. Finally, the tree stand stabilizer hereof may be anchored to the tree without injury to the trunk or any other portion, and may be quickly attached to both the trunk and the tree stand without tools.

The tree stand stabilizer hereof includes an anchor attached to the tree, an attachment for mounting the stabilizer to the platform of the tree stand, and a rigid member or stay which connects the anchor and the attachment and maintains tension therebetween. The anchor may be in the form of a strap wrapped around the trunk of the tree or a step, spike, or other member which penetrates the tree trunk and is driven or screwed therein. The attachment may include, for example, a hook, a mounting eye, an eye splice or a loop which attaches to the platform at some distance outboard or distal from the trunk-engaging portion. A rigid member such as an arm or rod, or more preferably a stay such as a strap, cable, chain or rope serves to connect the anchor and attachment. It is believed that a relatively inextensible member is preferably, although an elastic cord or spring would nonetheless serve to main tension between the anchor and attachment.

In preferably forms, the stabilizer includes a tensioning member which may adjust the amount of tension applied between the attachment and the anchor. While this might include such devices as a taut-line hitch in the stay or a tightening bar inserted in a loop formed therein, the preferred embodiment employs a turnbuckle which provides not only selective and adjustable tensioning but also a degree of mechanical advantage.

In particularly preferred forms, the attachment is a loop sewed to the end of a flexible nylon strap which serves as a stay. Two of the stays and loops are provided, the loops being configured and sized to receive therein the corners of the platform of the stand. The loops may be interconnected to further ensure that the stabilizer remains attached to the platform. The anchor also preferably includes a nylon strap which is circumferentially wrapped around the trunk of the tree and tied thereon. A hook associated with the turnbuckle is placed under the anchoring strap, and the turnbuckle may then be turned to place the connecting strap in tension. The connecting strap is thus oriented at an oblique angle relative to the platform and includes force components which act downwardly and toward the tree on each connecting strap, and the two connecting nylon straps each exert forces having opposing horizontal components to laterally stabilize the platform.

BRIEF DESCRIPTION OF THE DRAWINGS

FIG. 1 is a perspective view of one embodiment of the present invention shown attached to a tree stand and anchored to a tree;

FIG. 2 is a top plan view with a section through a tree showing the embodiment of FIG. 1 attached to the distal end of the platform of the tree stand;

FIG. 3 is a side elevational view of the embodiment shown in FIG. 1;

FIG. 4 is a front elevational view of the embodiment shown in FIG. 1 with a portion of the supporting structure of the tree stand removed;

FIG. 5 is a side perspective view of an alternate embodiment of the tree stand stabilizer hereof showing the turnbuckle anchored to the tree by a step inserted therein;

FIG. 6 is a perspective view of a second alternate embodiment of the tree stand stabilizer showing the use of hooks as attachment means and a spacing bar extending therebetween; and FIG. 7 is a front elevational view of a third alternate embodiment of the present invention employing intersecting loops to attach the stabilizer to the platform of the tree stand.

DESCRIPTION OF THE PREFERRED EMBODIMENT

Referring now to the drawing, a tree stand stabilizer 10 is shown in FIG. 1 applying tensioning force between a tree stand 12 and a tree 14. Tree stand stabilizer 10 broadly includes anchoring means 16, connecting means 18, and attachment means 20. Preferred embodiments also include adjustable tensioning means 22.

Tree stand 12 used in conjunction with the tree stand stabilizer 10 includes a platform 24 elevated relative to the ground (not shown) and supporting structure 26. Platform 24 includes a first end 28 associated with a tree-engaging member 30 and a distal end 32 located outboard and remote from the trunk 34 of the tree 14 relative to first end 28 which is located relatively proximate or even in engagement with the trunk 34. The tree-engaging member 30 shown in the tree stand illustrated in FIGS. 1–4 and FIGS. 6 & 7 is a metal bar for engaging the outside of trunk 34. Distal end 32 includes corners 36 and 38 which are laterally spaced apart.

The supporting structure 26 as shown in FIG. 1 includes an upright brace 40 pivotally connected to the tree-engaging member 30, hangers 42 and 44 in the form of cables or wires extending downwardly and outwardly from the top of the brace 40 to attach to the platform 24 at a location spaced outwardly or distally of the tree-engaging member 30, and a belt 46 which extends circumferentially around the trunk 34. The brace 40 includes crosspiece 48 located at the top thereof, with belt 46 extending between the ends of the crosspiece and around the back of the trunk 34.

The tree stand shown in FIGS. 1–4 and FIG. 6 is intended to correspond to the Timb-R-Lock model sold by Amacker Sales, Inc. of Delhi, La. An alternate tree stand 12A using struts 50 instead of wires for hangers 42 and 44 and a V-shaped yoke 52 at the first end 28 of the platform 24 for engaging the trunk 34 is shown in FIG. 5 and corresponds roughly to the tree stand sold under the mark Spirit by Loc-On Co. of Greensboro, N.C. It should be understood that the stabilizer hereof is useful with a variety of different tree stands and only a few of those are illustrated and described herein.

In greater detail, the anchoring means 16 as shown in FIGS. 1–4 and 6 & 7 includes a band 54 oriented in circumferential relationship to the trunk 34. The band is preferably made of standard nylon webbing about ¾ inch wide and slightly less than 1/32 inch in thickness which is lightweight, easy to carry and tie around a tree trunk 34, and provides satisfactory strength. Alternatively, band 54 could be made of chain, cable, rope or any other flexible member capable of fastening around the tree as part of anchoring means 16. The band 54 is preferably wrapped twice or more around the trunk 34 and then tied in any suitable knot which will prevent slippage. The length of the webbing used in the band will vary according to the thickness of the trunks 34 selected for the tree stand 12, but it has been found that a length of about 18 feet will be ample for most applications.

In the embodiment of FIG. 5, a step 56 and link 58 such as a carabineer or S-hook form anchoring means 16. The step is of a conventional design for penetrating into the trunk 34 by using a spike or tapered screw, and an L-shaped portion is generally visible for enabling the user to climb into the tree stand. The link 58 is located at the bend between the spike and the L-shaped portion for attachment to the tensioning means 22A, as shown.

Connecting means 18, as shown in FIGS. 1–4 and FIG. 7 preferably includes a pair of stays 60 and 62 which are made of 1 inch wide nylon webbing having a thickness of about 1/32 inch. The webbing is flexible when not in tension and is relatively inelastic. As shown in FIGS. 2 and 3, stays 60 and 62 are sewn together at junction 64 therebetween with at least one of the stays 60 or 62 looping back over the other stay to provide an area of reinforcement where the stitching extends through three or more layers.

In the embodiment of the stabilizer 10A shown in FIG. 5, the stays 60A and 62A are formed of a steel cable 64 of a diameter of about ⅛ inch thickness. The cable is provided with a clamp 66 at its midpoint which presents an eye 68 for attachment to tensioning means 22 and prevents the relative lengths of stays 60A and 62A from varying.

In the embodiment of the stabilizer 10B shown in FIG. 6, stays 60B and 62B are formed of a length of steel chain 70. The chain may be attached to the tensioning means 22 at one of the links thereof, as desired by the user, thereby preventing the lengths of the stays 60B and 62B from changing.

Tensioning means 22 interconnects the connecting means 18 and the anchoring means 16 in the embodiments of the invention hereof, although they could be placed between the connecting means 18 and the attachment means 20. Tensioning means 22 is preferably a turnbuckle 72 as shown in the embodiments hereof, which includes a sleeve 74, eyebolt 76 and hook 78 in the embodiment shown in FIGS. 1–4 and 6 & 7. The eyebolt 76 and hook 78 are threaded into the sleeve 74 in the conventional manner so that by twisting the sleeve 74, the overall length of the turnbuckle 72 will be adjusted. In the embodiment of FIG. 5, a second eyebolt 80 is substituted for the hook 78 for attachment to the link 58, while in the embodiment of FIG. 6, a second hook 82 is substituted for eyebolt 76 for attachment to chain 70.

As shown in the embodiment of FIGS. 1–4, the attachment means 20 constitutes a pair of loops 84 and 86 sewed to the distal end of each stay 60 and 62 respectively. The loops 84 and 86 are formed of 1 inch width nylon webbing of about 1/32 inch thickness. A stretch 88 of the same material is sewed onto each stay 60 and 62 at stitching locations 90, 92, 94 and 96 to form the loops 84 and 86 respectively. The loops are each interconnected by a span 98, also of 1 inch nylon webbing as described above. In the preferred embodiment shown in FIGS. 1-4, a single length of webbing forms stays 60 and 62 and span 98 for improved strength by limiting connections between webbing sections and limiting the labor involved in assembling the components.

In the embodiment shown in FIG. 5, the tree stand stabilizer 10A includes stays 60A and 60B are provided with bights 100 and 102 formed in the distal ends of the cable 64 by clamps 104 and 106. The bights 100 and 102 serve as the attachment means for coupling the stays 60A and 60B to mountings 108 secured to the bottom of platform 24 as shown therein.

In the tree stand stabilizer 10B shown in FIG. 6, attaching means 20 includes a pair of S-hooks 110 and 112 attached to stays 60B and 62B respectively. Because the platform 24B as shown therein has no permanent attachment mounting for receiving the S-hooks 110 and 112, a spacer bar 114 is attached to the S-hooks as shown to maintain separation therebetween and between the stays 60B and 62B. The S-hooks 110 and 112 are inserted through the end links of chain 70 and hold fast to the distal end 32B of the platform 24B when in tension, but may be easily removed when tension is removed from the stays 60B and 62B.

The embodiment shown in FIG. 7 represents a modified version 10C of the tree stand stabilizer 10 shown in FIGS. 1-4. Stabilizer 10C employs the same anchoring means and tensioning means as in the embodiment shown in FIGS. 1-4. The stays 60C and 62C are made of the same 1 inch webbing described above and are preferably formed of a single length of webbing which extends into the loops 84C and 86C. The loops 84C and 86C overlap, with the span 98C also of the same 1 inch wide nylon webbing. The stretches 88C intersect and are stitched together at intersection 116. The span 98C are part of to the webbing which forms the stays 60C and 62C and outer portions of the loops 84C and 86C. The stretches 88C are sewed at stitching locations 90C, 92C, 94C and 96C to form the loops 84C and 86C.

When using the embodiment of the tree stand stabilizer 10 shown in FIGS. 1-4, the user first positions and secures the tree stand 12 according to its particular configuration, which may include raising the stand to a height of ten to fifteen feet above the ground, unfolding the platform 24 away from the upright brace 40, and attaching the belt 46 in secure relationship around the trunk 34. The tree stand 12 is thus positioned with the distal end of the platform relatively remote from the tree trunk 34 and the tree-engaging member 30 against the bark or surface of the trunk.

The user then wraps the band 54 in circumferential relationship around the trunk 34, preferably making several wraps. The band is tied in position by a suitable knot (e.g. shoelace knot, square knot, etc.), and the loops 84 and 86 are placed over the corners 36 and 38 of the platform 24. The hook 78 is then placed under the band 54 and the stays 60 and 62 are tensioned by rotating the sleeve 74 of the turnbuckle to tighten the stays. This in turn pulls downwardly on the distal end 32 of the platform 24 to create a moment arm around the location where the hangers 42 attach to the platform 24, thereby causing tree-engaging member 30 to remain in contact with the trunk 34 even if the user should stand on top of the first end 28 of the platform 24. The stabilizer may be easily removed by counter-rotating the sleeve 74 of the turnbuckle 72 to release tension, pulling the hook out from under the band 54, removing the loops 84 and 86 from the corners of the platform and untying and removing the band 54.

When the stays 60 and 62 are placed in tension, each exerts a generally linear force therealong having downward, inward (toward the trunk 34) and horizontal (generally tangential to the trunk 34) vector components on the platform 34. The horizontal components are opposing, which is to say that the horizontal component exerted by stay 60 is toward loop 86 and is opposed by a horizontal component exerted by stay 62 of an equal magnitude in the direction of loop 84. The opposing horizontal force components thus resist side to side shifting of the platform 24. As may be seen form the drawing, the stays 60 and 62 are obliquely angled relative to the plane of platform 24.

The operation of the stabilizer 10A shown in FIG. 5 is similar in that the tree stand 12A is first installed with the V shaped yoke 52 in engagement with the trunk 34. Step 56 is driven or screwed into the trunk 34 with the L-shaped portion depending downwardly from the spike portion. Link 58 is located at the bend between the spike portion and the L-shaped portion and passes through the opening of the eyebolt 80. Bights 100 and 102 are then looped over the mounting 108 as shown, and the turnbuckle is tightened by twisting the sleeve 74 as mentioned above. By twisting the turnbuckle 72, tension is applied to the stays 60A and 62A which depend at an oblique angle from the plane of the platform 24A. The stays 60A and 62A thus exert a force in a generally downward and inward (toward the trunk 34) on the platform 24A, and the tensioning force exerted by each stay 60A and 62A includes a horizontal component in opposing directions to one another.

Tree stand stabilizer 10B includes an anchoring means 16 similar to the embodiment of FIG. 5 but turnbuckle 72 is attached directly to step 56 by second hook 82. S-hooks 110 and 112 are then placed over the distal end 32 of platform 24 and stays 60B and 62B are tightened as described by twisting sleeve 74. Spacer bar 114 prevents slippage of the S-hooks 110 and 112 together and ensures that the tensioning force applied by stays 60B and 62B on platform 24 include downward, inward and opposing horizontal components, and that the stays 60B and 62B remain at an oblique angle to the plane of platform 24.

The embodiment of FIG. 7 operates in much the same way as that of FIGS. 1-4. The anchoring means and tensioning means are employed in identical fashion. However, the corners 36 and 38 of the platform 24 would be located within only the respective portions of each loop 84C and 86C and not in the region 120 where the loops 84C and 86C overlap. This ensures that the loops remain over the platform and that the force imparted by stays 60C and 62C remain downward, inward and horizontally opposed.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the literal scope of the invention as set out in the following claims.

I claim:

1. In combination:

a platform adapted for releasable mounting to an upright tree trunk in a general horizontal orientation for supporting a person thereon, said platform including an inboard trunk-engaging portion and an outboard distal portion presenting the outer margin of the platform; and means for releasably securing said platform to said trunk, including:

an upper attachment assembly comprising a pair of elongated, obliquely oriented upper tension members respectively secured to said outboard platform portion at spaced locations thereon and extending upwardly therefrom, and upper trunk attachment means for releasably engaging said trunk at a point above said platform, the upper ends of said upper tension members remote from said platform being operably coupled with said upper truck attachment means for placing the upper members under tension; and a lower attachment assembly comprising a pair of elongated, obliquely oriented lower flexible members operably coupled to said outboard platform portion at spaced locations, said lower flexible members extending downwardly from said outboard platform portion towards said trunk and in a mutually converging relationship with each other, said lower attachment assembly also including flexible lower trunk attachment means extending at least partially around and releasably engaging said trunk at a point below said platform and remote therefrom, there being structure for coupling said lower flexible members and said lower trunk attachment means, and for placing the lower flexible members in tension, in order to maintain the inboard portion of said platform in operative engagement with said trunk in the event that said person stands on said inboard portion.

2. The combination as set forth in claim 1, wherein said coupling structure is adjustably tensionable.

3. The combination as set forth in claim 2, wherein said coupling structure includes a turnbuckle.

4. The combination as set forth in claim 1, wherein said lower flexible members comprise stays of nylon webbing.

5. The combination as set forth in claim 1, wherein said lower flexible members comprise stays of steel cable.

6. The combination as set forth in claim 1, wherein said lower flexible members comprise stays of steel chain.

7. The combination as set forth in claim 4, wherein said lower flexible members present loops for attachment to the outboard distal portion of said platform.

8. The combination as set forth in claim 7, wherein a portion of each of said loops intersect.

9. The combination as set forth in claim 1, wherein said flexible lower attachment means include structure for avoiding penetration of the tree trunk.

10. The combination as set forth in claim 1, wherein said flexible lower attachment means includes a band oriented in circumferential relationship to the tree trunk.

* * * * *